United States Patent [19]

Janssen

[11] Patent Number: 5,754,850
[45] Date of Patent: May 19, 1998

[54] REAL-ESTATE METHOD AND APPARATUS FOR SEARCHING FOR HOMES IN A SEARCH POOL FOR EXACT AND CLOSE MATCHES ACCORDING TO PRIMARY AND NON-PRIMARY SELECTION CRITERIA

[75] Inventor: Richard R. Janssen, Agoura Hills, Calif.

[73] Assignee: RealSelect, Inc., Westlake Village, Calif.

[21] Appl. No.: 763,168

[22] Filed: Dec. 10, 1996

Related U.S. Application Data

[63] Continuation of Ser. No. 241,193, May 11, 1994, abandoned.

[51] Int. Cl.[6] .................................................. G06F 17/30
[52] U.S. Cl. ..................... 395/615; 395/201; 395/226; 395/227; 395/605; 395/925; 364/478.02; 364/709.04; 364/710.04
[58] Field of Search ................................. 395/605, 615, 395/201, 227, 226, 925; 364/478.02, 709.04, 710.04

[56] References Cited

U.S. PATENT DOCUMENTS

| | | | |
|---|---|---|---|
| 4,870,576 | 9/1989 | Tornetta | 364/401 |
| 5,032,989 | 7/1991 | Tornetta | 364/401 |
| 5,146,548 | 9/1992 | BiJnate | 395/117 |
| 5,235,680 | 8/1993 | BiJnate | 395/610 |
| 5,317,677 | 5/1994 | Dolan et al. | 395/77 |
| 5,325,297 | 6/1994 | Bird et al. | 364/419.07 |
| 5,402,336 | 3/1995 | Spiegelhoff et al. | 364/401 |
| 5,414,621 | 5/1995 | Hough | 395/210 |
| 5,418,951 | 5/1995 | Damashek | 395/600 |
| 5,475,375 | 12/1995 | Barrett et al. | 340/825.31 |
| 5,500,793 | 3/1996 | Deming, Jr. et al. | 364/401 |
| 5,550,746 | 8/1996 | Jacobs | 364/479.01 |
| 5,552,806 | 9/1996 | Lenchik | 345/156 |
| 5,584,025 | 12/1996 | Keithley et al. | 395/615 |

*Primary Examiner*—Thomas G. Black
*Assistant Examiner*—Jean R. Homere
*Attorney, Agent, or Firm*—Blakely, Sokoloff, Taylor & Zafman LLP

[57] ABSTRACT

A method and apparatus is provided for a search system based in software running on a personal computer. The personal computer is housed in a kiosk having a touch monitor and a printer. With the search system, selection features are selected and a search based upon these search features is performed. Each item in a database is examined to determine if an item has a given search feature. These search features are categorized into primary and non-primary search features. Items neither satisfying nor closely satisfying a given primary search feature are eliminated from the search. In contrast, items not satisfying a given non-primary feature may remain in a search pool. For both primary and non-primary features, if an item in a database is an exact match to a given search feature, then that item is assigned full points. If an item closely satisfies the search feature then that item is assigned full or partial points. After completion of comparing each primary and non-primary search features with each item in the search pool, predetermined number of items remaining in the search pool with the highest total points are displayed to the user of the search system.

30 Claims, 9 Drawing Sheets

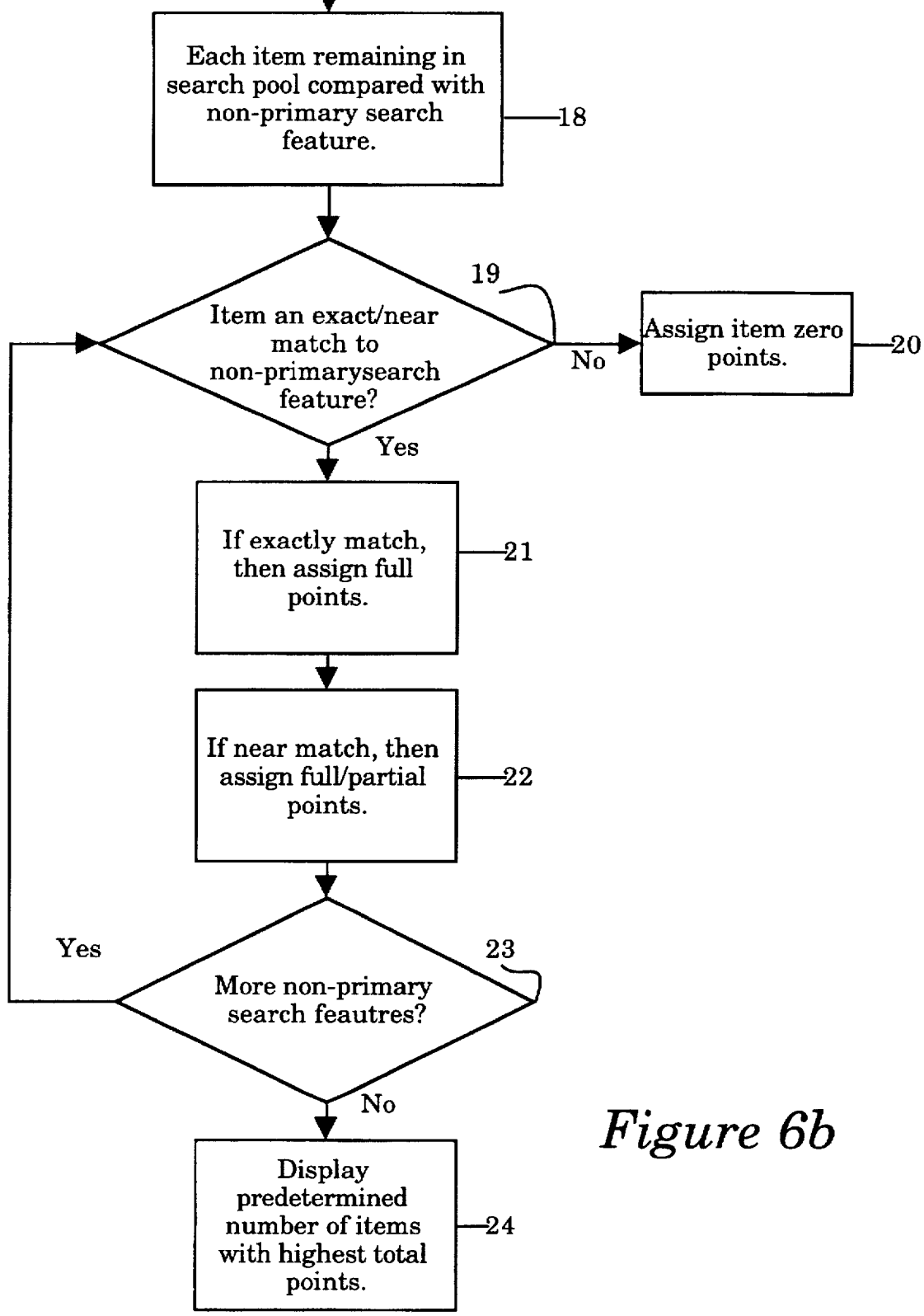

Point calculations

| Features | Data Source | 100% Compliance | Partial Compliance |
|---|---|---|---|
| 30 point features | | | |
| Location | | | |
| Zip Code | KCities.DB | value of zip code is an exact match | if value of zip code is adjacent then penalty of 2 major features. if value of zip code is outside of area then eliminate from search |
| 20 Point Features | | | |
| Number of Bedrooms | KRental.DB | | |
| Studio Apt options | NoBeds | any value = 20 pts | |
| 1 Bedroom | NoBeds | any value greater than .5 then 20 points | if value = .5 then 5 points |
| 2 Bedroom | NoBeds | any value 2 or more 20 points | if value = 2 then 5 points |
| 3 Bedroom | NoBeds | any value 3 or more 20 points | if value = 2 then 5 points. |
| Dual Master Bedrooms | NoBeds, DualMasters | if DualMasters = "Y" then 20 points | if NoBeds = 2 or more and DualMasters = "N" then 10 points |
| Number of Baths | KRental.DB | | |
| | use value of MaxBaths | Exact match, 1/2 less, or more - 20 points | 1 less = 10 points (penalty of 2 major features) |

*Figure 7a*

| Young Children | use value of YngChildren | points are assigned as follows:<br>Play area +3<br>supervised play area +1<br>wading pool +3<br>supervised pool +1<br>(next two are mutually exclusive)<br>Walk to daycare +3<br>Close to daycare +2<br>(next two are mutually exclusive)<br>Walk to Elementary school +3<br>Close to Elementary school +2<br>(next two are mutually exclusive)<br>Walk to Jr High +3<br>Close to Jr High +2<br>Planned Children's activities +3 | Points can range from 0 to 20 points |

*Figure 7b*

REAL-ESTATE METHOD AND APPARATUS FOR SEARCHING FOR HOMES IN A SEARCH POOL FOR EXACT AND CLOSE MATCHES ACCORDING TO PRIMARY AND NON-PRIMARY SELECTION CRITERIA

This is a Continuation Application of application Ser. No.08/241,193, filed May 11,1994, now abandoned.

BACKGROUND OF THE INVENTION

1. Field Of The Invention

The present invention relates to the field of computer search methods. More particularly, the present invention relates to a method and apparatus for searching a database for items satisfying specific features or closely satisfying specific features.

2. Art Background

Currently, various forms of computer searches exist including Boolean based searches. In a typical computer based search, a search is performed based on pre-selected features.

In a typical Boolean search, a search system examines a search item for exact matches and absence of matches. For items with which quantitative comparisons are possible, the items are examined to determine whether the items are greater than or less than a given threshold of a search feature. A text based search may examine the number of occurrences of a certain word in a text or character or characters in a text.

More specific examples of computer searches currently used include NEXUS® which utilizes a form of a tiered search. A user of the NEXUS® system initiates a search by selecting a set of search features. The NEXUS® system searches for items in a search pool which are exact matches with the search features. Once this first level of search is concluded, the user has the option to narrow the search by selecting additional search features. A new search pool composed of the previously selected items is searched using the new set of search features. This process may be repeated until a predetermined number of items are selected.

Another example of a computer search includes the multiple listing system (MLS) typically used by real estate agents searching for client desired homes. A database is used which contains homes for sale listed by agents and placed in the MLS.

The search method utilized in the MLS typically examines exact matches. For example, given a selection search feature of homes with a price range from $140,000 to $150,000, the MLS selects homes with prices within this range. However, the MLS does not select homes which may be a little under or a little over the price range. Therefore, the search range is absolute. In addition, if a real estate agent is searching for a home located in a specific zip code, a search performed by the MLS discards any home in the search pool which is located outside of the specified zip code, including homes which are only one block away from the specific zip code.

Although the MLS system searches and selects homes which are exact matches to the selected search features, a typical potential home buyer will accept homes which closely satisfies the selected search features. This may be especially true where few if any homes satisfy all of a potential homebuyer's desired search features.

The above described prior art computer search methods typically produce items in a search pool which are exact matches to the search features as the search result. In a search where few if any items in a search pool satisfy a given set of search features, and where a user of the search system accepts items in a search pool which are close matches to the search features, such as for users searching for homes for sale, method and apparatus for allowing a computer search system which produces a search result comprising items from a search pool which are exact matches and close matches are desired.

BRIEF SUMMARY OF THE INVENTION

Method and apparatus for a kiosk search system are provided. In accordance with one aspect of the present invention, a kiosk comprises a touch monitor, a printer, a printer output portion, a computer, a search software running on the computer and various storage mediums including CD ROMs, a hard disk and floppy disks. Databases containing items to be searched are stored in the storage mediums. CD ROMs are replaced at periodic intervals to update the databases. Further, modems and wireless modems are utilized to update the databases.

The kiosk of the present invention displays a plurality of selection screens on the touch monitor. A user touches an icon representing a selection as displayed on the touch monitor. Once a user has selected a predetermined number of search features, a search is performed based upon the selected search features.

At the completion of a search cycle, various screens illustrating information on the items in a search result are displayed to the user. At the user's option, the kiosk search system of the present invention prints out information on a user selected number of search result items.

In accordance with another aspect of the present invention, a search process begins with a selection of a number of search features. A search is performed using the search features for items in a database satisfying or closely satisfying the search features. Once a number of search features are selected, each item in the database is compared to a set of primary search features. Items neither satisfying nor closely satisfying a primary search feature are eliminated from further search. An item which satisfy or at least closely satisfy a primary search feature is assigned a predetermined number of points. The items in the database which are not eliminated from further search remain in a search pool.

The items remaining in the search pool are compared to a set of non-primary search features. Further, the items are assigned predetermined points for satisfying or closely satisfying each of the non-primary search features.

After each of the search features are examined in each of the items in the database, points assigned to each item in the search pool are totaled. A predetermined number of items in a search pool with the highest total points are selected as the search result. The items are sorted such that the predetermined number of items selected as search results are displayed to the user of the search system in the order of the item with the highest points.

Unlike the traditional search methods utilizing Boolean based search methods which examine for exact matches, the search method of the present invention considers "near" matches as well as exact matches. For example, an item in a search pool which fully satisfies a given non-primary search feature is given the predetermined full points. An item which closely satisfies a given search feature (a near match), may also be assigned a predetermined number of points. If an item in a search pool neither satisfies nor closely satisfies a given search feature, such item is assigned zero points for the particular non-primary search feature. Further, for some instances of near matches, an item in a search pool may be given full points for a search feature if the item closely satisfies that given search feature.

Further, the search system of the present invention may be utilized in searches for schools, doctors, cars, apartments, vacation packages, lawyers and CPA's. In addition, the search system of the present invention may be used on on-line services, interactive televisions and on stand alone computers.

In sum, the search system of the invention may be utilized for a search through a large group of items in a search pool, with a significant number of search features being selected. In addition, the search system is especially useful where few if any records satisfy all of the search features selected and where the user of the search system accepts close matches as part of the search result.

BRIEF DESCRIPTION OF THE DRAWINGS

FIGS. 6a and 6b are flow charts illustrating steps of the search method of the present invention.

FIGS. 7a and 7b are charts illustrating an exemplary point assignment method for the search system of the present invention.

DETAILED DESCRIPTION OF THE INVENTION

Apparatus and methods for a kiosk search system are disclosed.

On the kiosk search system of the present invention, a number of search features are selected and a database is searched. An item is assigned full points for fully satisfying a search feature, and assigned full or partial points for closely satisfying a search feature. The search features are either categorized as primary search features or as non-primary search features. A primary search feature must be either satisfied or at least be closely satisfied by an item or the item is discarded from the search pool. On the other hand, a non-primary search feature may not be satisfied by an item but the item may still remain in the search pool. Upon completion of the point assignment based on each search feature for each item in the search pool, a predetermined number of items with the highest total points are selected as the search result. The number of items to be selected may be predetermined by the user or fixed in the search system.

Figure 1:
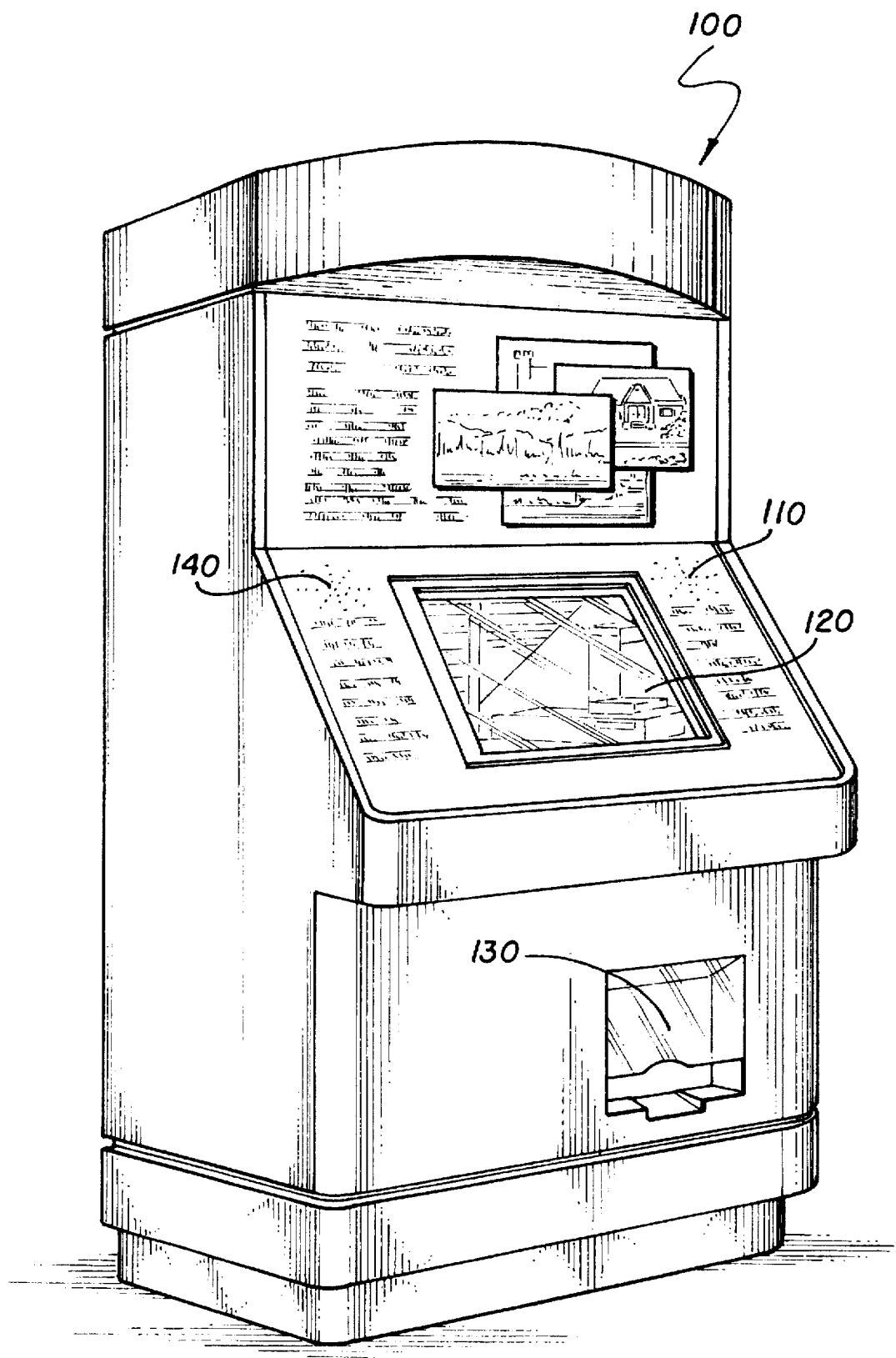
FIG. 1 illustrates an exemplary kiosk search system of the present invention.

FIG. 1 illustrates an exemplary kiosk search system of the present invention. A kiosk search system 100 has a touch monitor 120, a laser jet printer output portion 130, and audio output portions 110 and 140. The touch monitor 120 has a resolution of 800×600 screen display. Inputs from a user are received by touch monitor 120. Given a selection screen, a user may be presented with a number of search features to choose from. A user simply touches the icons associated with the search features to make a selection.

Figure 2:
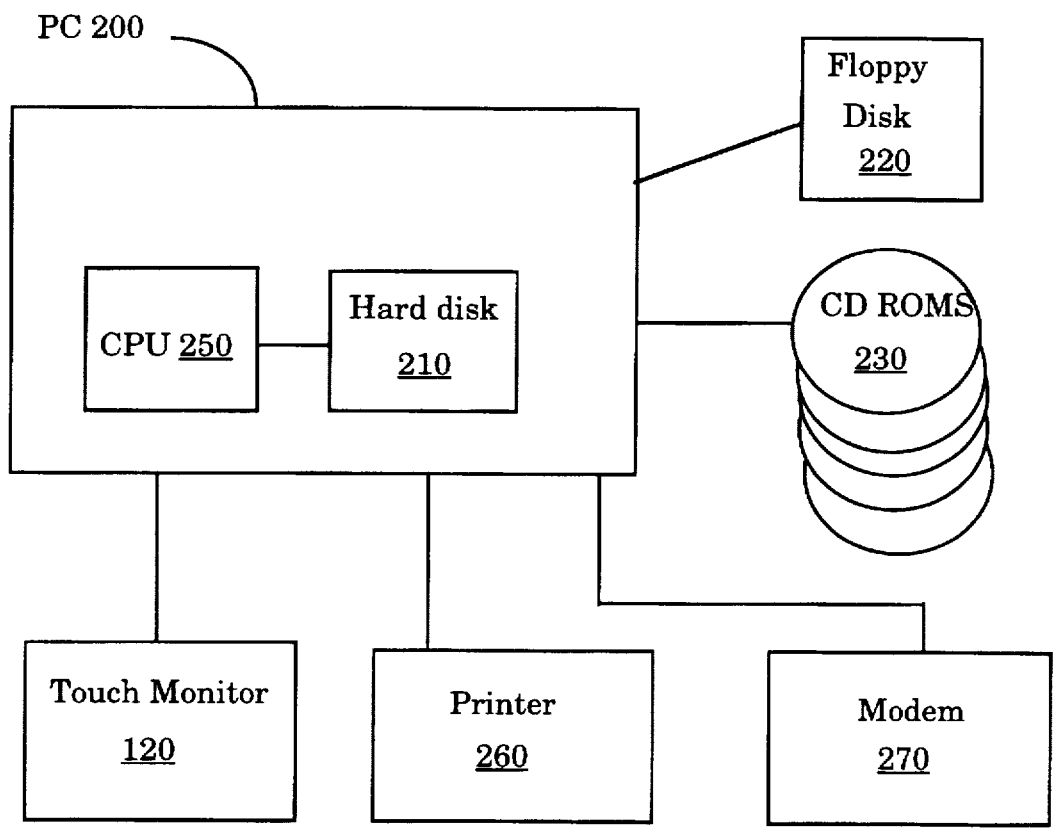
FIG. 2 is a block diagram of the apparatus of the search system of the present invention.

FIG. 2 is a block diagram of the search system of the invention. The search system of the invention is embodied in a software stored in hard disk 210 of personal computer (PC) 200. PC 200 is housed in kiosk search system 100 illustrated in FIG. 1. A database with items to be examined and data for individual screen displays are stored in three different storage mediums, specifically, hard disk 210, floppy disks 220 and CD ROMs 230. One or a plurality of CD ROMs 230 may be replaced during periodic intervals to update the database. Modem 270 or a wireless modem may also be utilized to update the database.

CD ROMs 230 may contain both video text as well as audio data. PC 200 produces occasional voice prompts to the user to prompt inputs. Audio data are output to a user through speakers 110 and 140 of kiosk search system 100 illustrated in FIG. 1.

Touch monitor 120 displays data retrieved from multiple sources, including floppy disks 220, hard disk 210 and CD ROMs 230. Data displayed on the screen is created by overlaying data over existing screen data and/or image. In an exemplary embodiment, the search system used on PC 200 is written in Windows® API. The picture images are stored in the JPEG standard photographic compression format. The search system is driven by CPU 250 of PC 200. Upon completion of each search cycle, various display screens containing information on items from the search result is displayed to the user. At the option of the user, information on one or more of the items from the search result may be printed on printer 260, which outputs a printout to the user through printer output portion 130 (illustrated in FIG. 1).

Figure 3:
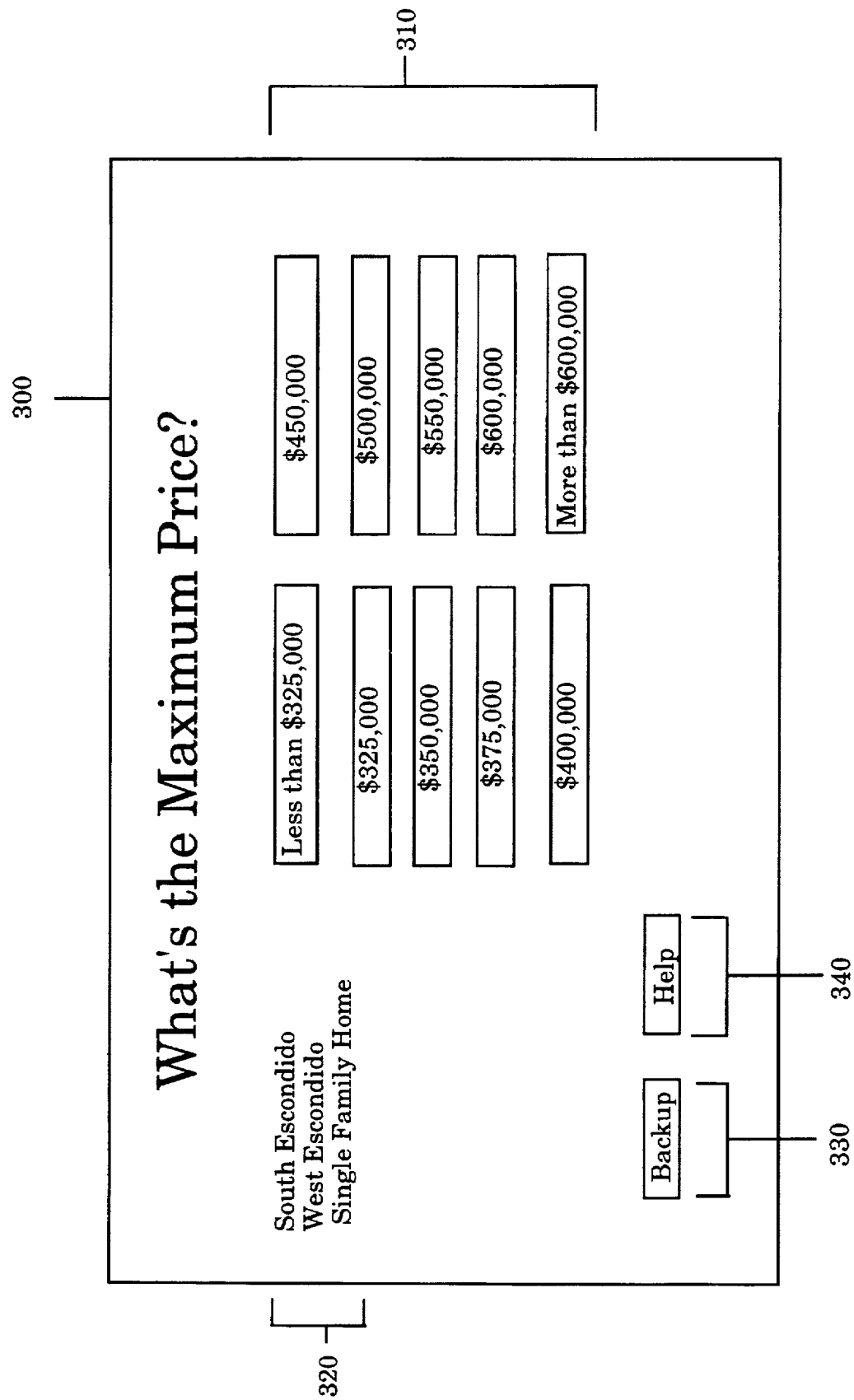
FIG. 3 is an exemplary display screen of the search system of the present invention.
Figure 4:
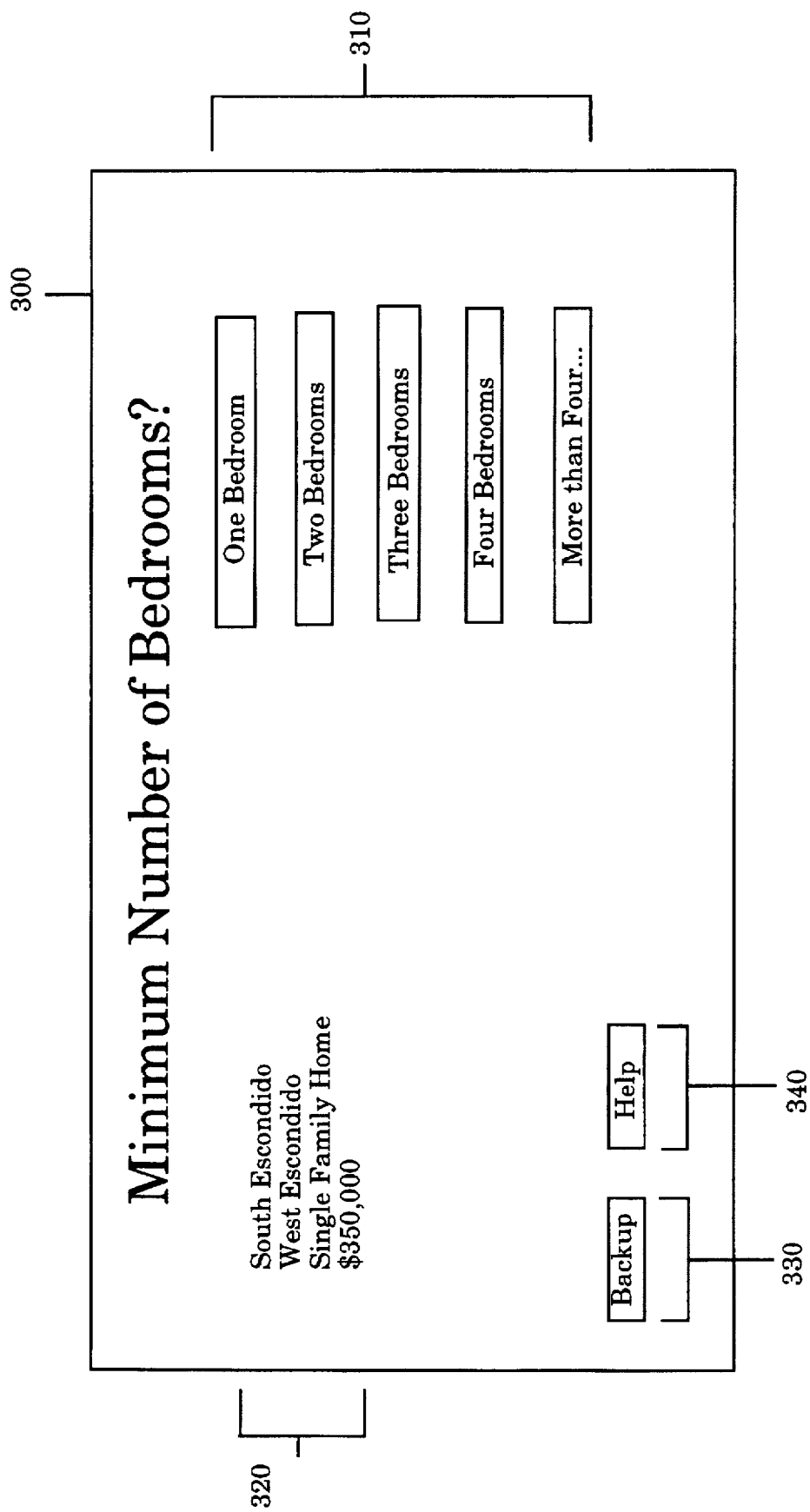
FIG. 4 is an exemplary display screen of the search system of the present invention.

FIGS. 3 and 4 illustrate an exemplary selection screen for a home search embodiment of the present invention. A user of a home search system selects search features from the displayed selection screens. In FIG. 3, a user is asked what is the maximum price he or she is willing to pay for a potential home. The selection of maximum prices are displayed within rectangular borders. These rectangles represent selection icons 310 which the user touches to select a given maximum price. Portion 320 on display screen 300 lists the search features selected from previous selection screens. Backup icon 330 allows the user to backup to the previous screen and help icon 340 displays a help screen which directs the user on how to use the search system.

FIG. 4 illustrates an exemplary selection screen following the selection screen of FIG. 3. The user is asked the minimum number of bedrooms he or she wants in a home. Selection icons 310 displays different number of bedrooms. As compared to portion 320 of FIG. 3, portion 320 of FIG. 4 has an additional entry of $350,000. The additional entry indicates that the user selected $350,000 as the maximum price in display screen 300 of FIG. 3.

Some selection screens are displayed in a fixed sequence. Other selection screens are displayed according to a user's response to a previously displayed selection screen. For example, in the selection screen of FIG. 3, a user may select the "More than $600,000" icon as their choice of a maximum price for a potential home. A subsequent selection screen may include a question regarding whether or not the user wants a detached servants' quarters included in the home he or she would like to purchase. This selection screen may be displayed only to a user who has selected a maximum home purchase price of over $500,000, for example, in the selection screen of FIG. 3. Further, a selection screen asking the maximum price a user is willing to pay for a home, may be dependent on a selection screen asking a user where he or she wants to live. The price range of homes located in the area selected by the user are displayed as selection choices in a selection screen asking the maximum home purchase price.

Figure 5:
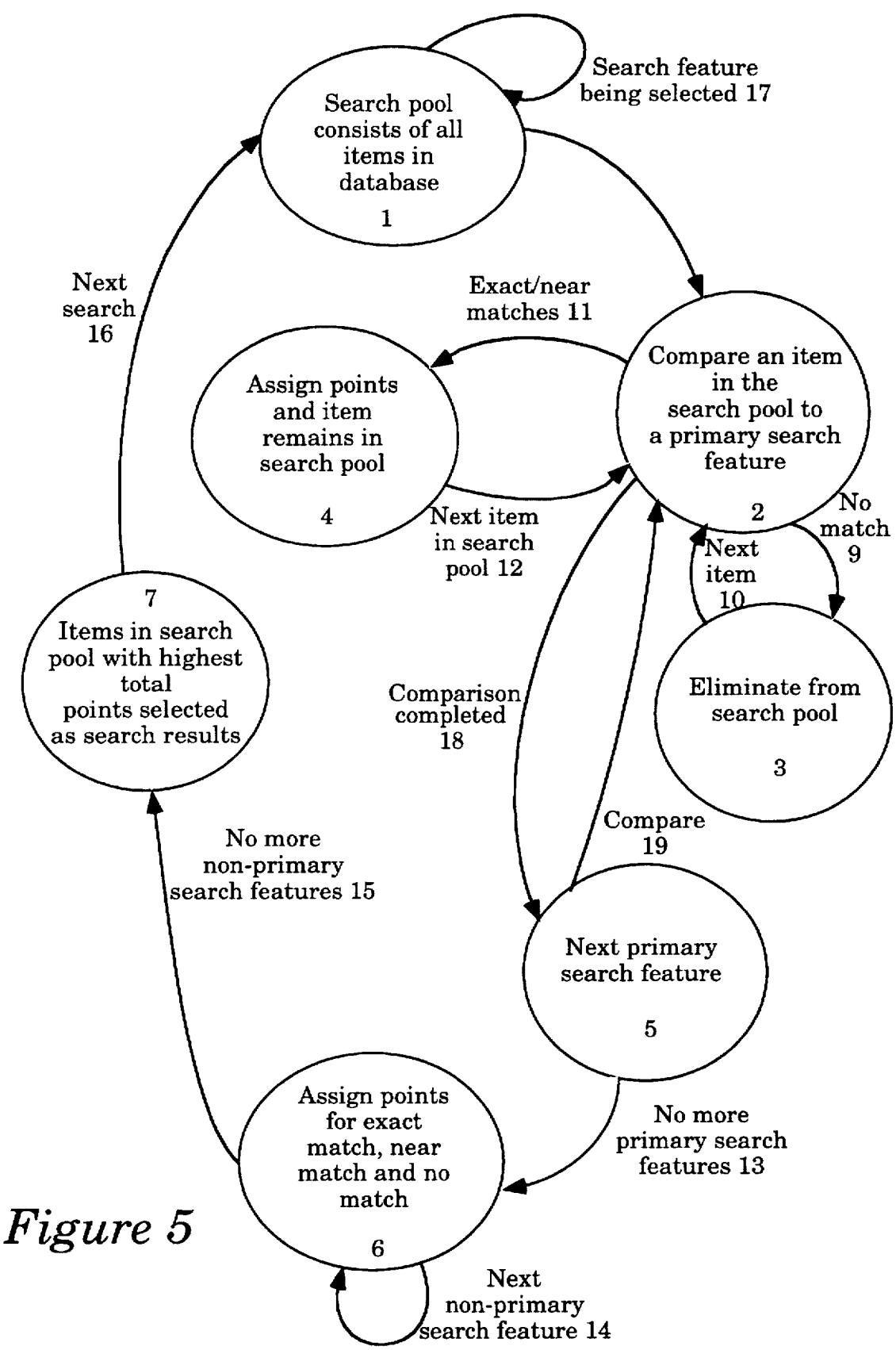
FIG. 5 is a state diagram illustrating the search method of the present invention.

FIG. 5 is a state diagram illustrating the search method of the present invention. In state 1, all items in a database to be searched are considered to be in a search pool. The process remains in state 1 while search features are being selected by a user (loop 17). The search begins when all desired search features are selected by the user (transition 8). In state 2, each item in the database is compared to a given primary search feature. If an item in the database satisfies or closely satisfies the given primary search feature (transition 11), the item is assigned points in state 4. In state 3, if an item in the search pool neither satisfies nor closely satisfies a given primary search feature, the item is eliminated from the search pool and from further search.

Each item in the search pool is compared to the same primary search feature (transitions 10 and 12). When all items in the search pool are compared to the given primary search feature (transition 18), the next primary search feature is retrieved in state 5. In state 2, this primary search feature is compared to each item remaining in the search pool in state 2 (transition 19). After each primary feature is compared to the items in the search pool, each non-primary search feature is compared to each item remaining in the search pool (transition 13). In state 6, predetermined number of points are assigned to items for satisfying or closely satisfying a given non-primary search feature (transition 14). When all non-primary search features are compared to each item remaining in the search pool (transition 15), a predetermined number items in the search pool with the highest total points are selected as the search results.

Figure 6A:
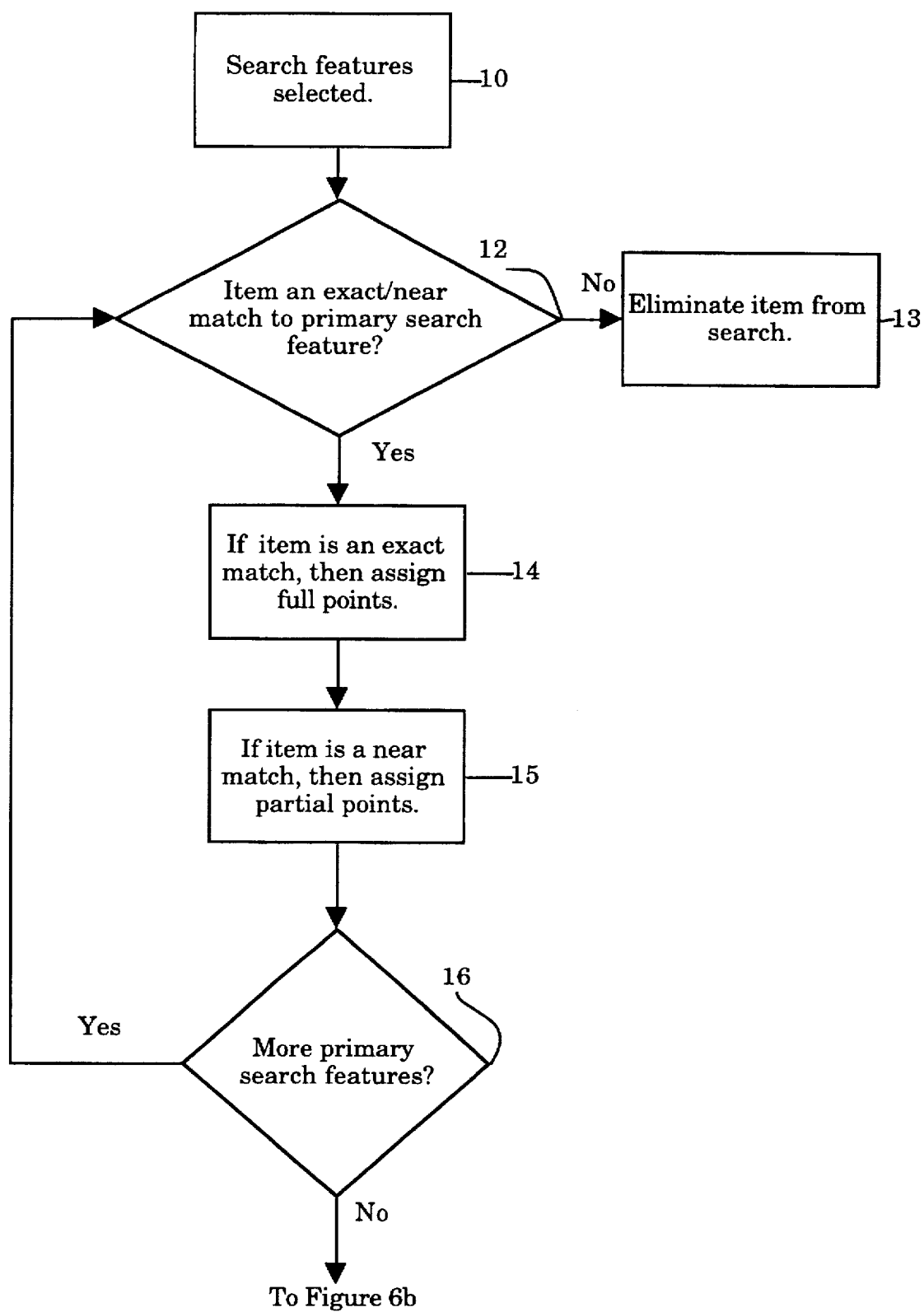

FIGS. 6a and 6b are general flow charts illustrating the steps followed by the search method of the present invention. In step 10, a user selects a number of search features as desired. Primary search features are examined before non-primary search features. In step 12, an item in a database is examined to determine if the item is either an exact match or a near match to a primary search feature. In other words, an item is examined to determine whether an item satisfies or closely satisfies a given primary search feature.

In step 13, if the item being examined neither fully satisfies nor closely satisfies a given primary search feature, the item is eliminated from the search pool. On the other hand, if an item being examined fully satisfies a given primary search feature then in step 14, the item is given predetermined full points. If the item does not satisfy the given primary search feature but is a close match to the given primary search feature, then in step 15, the item is assigned a predetermined number of either full or partial points.

The process of examining each item in the database is repeated for a given primary search feature. In step 16, if more primary search features exist, then the process is repeated and each item in the database is examined for each additional primary search features.

FIG. 6b is the continuation of the general flow chart illustrated in FIG. 1a. In step 18, each item remaining in the search pool after being compared to all the primary search features is examined to determine whether or not the item satisfies the user selected non-primary search features. In step 19, an item is examined to determine whether or not the item satisfies or closely satisfies a given non-primary search feature. If the item does not satisfy a given non-primary search feature, then in step 20 the item is given zero points for that particular non-primary search feature.

In step 21, if the item is an exact match, then the item is assigned a predetermined number of full points for satisfying the non-primary search feature. In step 22, if an item is a near match, then the item is given a predetermined number of full or partial points for closely satisfying the specific non-primary search feature. The examination of an item in a search pool for whether or not the item satisfies, closely satisfies, or does not satisfy a given non-primary search feature is repeated for all the items remaining in the search pool.

In step 23, if there are additional non-primary search features, each item in a record is examined for the remaining additional non-primary search features. Finally, in step 24, if all the non-primary search features are compared to the items remaining in the search pool, then a predetermined number of items in the search pool with the highest total points are displayed to the user as the search result.

FIGS. 7a and 7b illustrate how points may be assigned to certain selected search features for exact matches and close matches for a home rental search embodiment of the invention. The first column illustrates search features which may be chosen by a user during the search including various rental home features such as location, rental amounts and number of bedrooms. In the second column, sources of data for the various features for a given item is given. In the third column, conditions for a 100% satisfaction of a given feature are described. Finally, in the fourth and final column, conditions for partial compliance to a given feature are illustrated.

In the first entry to the chart in FIG. 7a, location is listed as a zip code. The zip code feature is considered to be a primary search feature and given the highest potential points since the feature is typically one of the most important features to a potential home renter. Once a user of a home rental search system of the invention selects potential locations where the user may want to rent homes, such locations are compared to properties for rent in a search pool by the zip codes.

The search system of the invention compares the selected zip code to the zip code of each of the homes for rent stored in a database, KRENTAL.DB. A database, KCities.DB, contains zip codes adjacent to the selected zip code. The zip code of each home in KRENTAL.DB is compared against the selected zip code as well as against the adjacent zip codes in KCities.DB. If a home for rent satisfies this zip code feature by exactly matching the zip code selected, then that specific rental home is in 100% compliance to this location feature and is assigned 30 points. On the other hand, if the zip code of the rental home being compared is only adjacent to the selected zip code, then only a partial compliance is satisfied. The points assigned for a partial compliance in this case is the full potential points minus a predetermined penalty points such as 20 points. If the zip code of the rental home being compared to the selected zip code is neither an exact match nor adjacent to the selected zip code, then the corresponding rental home is eliminated from the search pool.

Under the number of bedrooms feature, if the selected number of bedrooms equals that of a studio apartment then no matter what number of bedrooms a given rental home in a search pool has, a given rental home is deemed to be under 100% compliance and is assigned the full 20 points.

If the user selects one bedroom rental property, then any rental property in the search pool with a number of beds greater than 0.5, is under 100% compliance and is assigned the full 20 points. Any rental property with a number of bedrooms equaling to 0.5, such as studio apartment, is under partial compliance with the selected one bedroom feature and is assigned 5 points.

If a user selects a two bedroom rental property, then any rental property in the search pool with the number of bedrooms equaling two or more is under 100% compliance with the selected two bedroom feature and is assigned 20 points. Any rental property with only one bedroom is under partial compliance with the selected two bedroom feature and is assigned 5 points. If the user selects a three bedroom rental property, then any rental property in a search pool with three or more bedrooms is under 100% compliance with the selected three bedroom feature and is assigned 20 points. Any rental property in the search pool with only two bedrooms are awarded 5 points.

If a user selects a rental property with dual master bedrooms, then any rental property in a search pool with dual master bedrooms is under 100% compliance with the selected dual master bedrooms feature and is assigned 20 points. Any rental property in the search pool with two bedrooms or more and no dual master bedrooms is under partial compliance and is assigned 10 points.

Under the number of baths feature, the value of MaxBaths in KRENTAL.DB is used. MaxBaths is a field in the KRENTAL.DB indicating the number of bathrooms each rental property in KRENTAL.DB has. 100% compliance is attained and full points are assigned to any rental property which has as the value for MaxBaths the same exact number of bathrooms selected by the user. Full points are also assigned if a rental property has more bathrooms or one-half less than the number of bathrooms selected by the user. Partial compliance is attained and 10 points is assigned to any rental property in the search pool with a MaxBaths value which is only one less than the number of bathrooms selected by the user.

Table A is a chart illustrating an exemplary point calculation method and prioritization for a rental home search embodiment of the present invention. The chart illustrates location and price as primary search features for a rental home search embodiment. Selection of a location is typically based upon the locations of work place, child care facilities and family proximity. Range of price is typically selected by and based upon income. Properties outside of the selected location and price range are discarded from the search pool. Since location and price in this case are assigned as being primary search features, these search features are assigned highest potential points out of all the other search features. The remaining search features with lesser potential full points are the non-primary search features.

Next highest potential points are assigned to search features including number of bedrooms and baths, corporate apartments, whether pets are allowed, whether amenities for handicapped people are available, whether elevators, covered parking, assigned parking and features for young children and senior citizens are provided. These search features are typically determined by the number of people intended to live in the home, the family needs such as for children, handicapped people and senior citizens and current possession of pets. Further, parking is rated in this group because, automobiles are typically a renter's most expensive possession.

The next priority group include features for planned activities, swimming pool, tennis court, air conditioning, garages, gated property, gated parking, smaller apartment complex, proximity to the ocean and walking distance to public transportation. The search features in this priority group describe lifestyle preferences which may be more difficult to satisfy if these features are not part of the rental property features.

Finally a last priority group include features which are not necessary but may still be desired. These search features are the type of features of rental properties which enhance the attractiveness of the rental property community but does not cause a potential renter to eliminate the property from the search pool. Such search features may include leasing period, washer/dryer, refrigerators, dishwasher, central heat and air, newer carpets, on site laundry, furnished apartment, fitness center, newer property, military discounts, moderate discount, patio/balcony, extra storage, clubhouse, courtesy patrol, home alarm system, monitored home alarm system, visitor intercom system, sauna, spa, basketball court, racquetball court, pool tables, quiet property, fireplace and scenic view.

In addition to the above described prioritization, a user may change the priorities of the search features to more closely correspond to the user's value system. Certain lower priority search features may become higher priority search features and hence be assigned higher points. The user may enable this self tailored prioritization by simply touching a particular search feature displayed on the touch monitor of the kiosk search system of the present invention more than once. By touching the particular search feature more than once, the user is indicating that the particular search feature is to be given higher priority than the other selected search features.

Table B is a chart illustrating an exemplary record format for each home in a database for a home rental embodiment of the present invention. KRENTAL.DB is a database used for searching. KRENTIF.DB is a database used to display additional information on certain rental homes. These databases are created from three Administration Rental Tables: RENTALS.DB which contains basic information regarding a given apartment community, RENTPROF.DB which contains profile information about a given apartment community and RENTUNIT.DB which contains profile information about specific rental unit types. The first column of the chart describes each field name of KRENTAL.DB, and the second column describes the Administration Rental Table from which the value for the particular KRENTAL.DB field is retrieved. The third column in the chart describes which field in the particular Administration Rental Table contains the value for the corresponding KRENTAL.DB field. The fourth and final column of the chart describes how to interpret the value stored in each field of the particular Administration Rental Table.

The above described search system of the present invention may be utilized in searches involving but not limited to searches for home loans, schools, doctors, cars, apartments, vacation packages, lawyers and CPA's. In addition, the search system of the present invention may be utilized on on-line services, interactive television and on stand alone computers.

What was described is an apparatus and method for a kiosk search system for searches where few if any items in a search pool satisfy all of the selected search features and/or where the user of the search system accepts as search results items in a search pool which come close to satisfying one or more of the selected search features.

While certain exemplary embodiments have been described in detail and shown in the accompanying drawings, it is to be understood that such embodiments are merely illustrative of and not restrictive on the broad invention and that this invention is not limited to the specific arrangements and constructions shown and described.

TABLE A

Point Calculations

| Features | Data Source | 100% Compliance | Partial Compliance |
|---|---|---|---|
| 30 point features | | | |
| Location | | | |
| Zip Code | KCities.DB | value of zip code is an exact match | if value of zip code is adjacent then penalty of 2 major features. if value of zip code is outside of area then eliminate from search |
| Rental Amount Range | | | |
| from −10% to +10% of specified amount | KRental.DB MinPrice | Within range | |
| From −11 to −20 to +11 to 25 | KRental.DB MinPrice | Within range | |
| Outside of range | | | |
| 20 Point Features | | | |
| Number of Bedrooms | KRental.DB | | |
| Studio Apt options | NoBeds | any value = 20pts | |
| 1 Bedroom | NoBeds | any value greater than .5 then 20 points | if value = .5 then 5 points |
| 2 Bedroom | NoBeds | any value 2 or more 20 points | if value = 1 then 5 points |
| 3 Bedroom | NoBeds | any value 3/ or more 20 points | if value = 2 then 5 points |
| Dual Master Bedrooms | NoBeds DualMasters | if DualMasters = "Y" then 20 points | if NoBeds = 2 or more and DualMasters = "N" then 10 points |
| Number of Baths Exact Match or ½ less | KRental.DB use value of MaxBaths | Exact match, ½ less, or more - 20 points | 1 less = 10 points (penalty of 2 major features) |
| Cats Allowed | use value of Cat | if 'yes' will be 20 points | if on approval then 20 |
| Dogs Allowed | use value of Dog | if Yes will be 20 | if on approval then 15 |
| Handicap | use value of Handicap | if Yes will be 20 based on Specifically states Handicap MaidService Emergency 24 hr call Monotored Alarm Elevators | Points can range from 0 to 20 |
| Elevators | use value of Elevators, | if Yes or if single story building will be 20 | |
| Covered Parking | use value of CoveredParking | if Underground, Garage or covered will be 20 points | |
| Assigned Parking | use value of AssignedParking | if AssignedParking or Garage then 20 points | |
| Young Children | use value of YngChildren | points are assigned as follows: Play area +3 supervised play area +1 wading pool +3 supervised pool +1 (next two are mutually exclusive) Walk to daycare +3 Close to daycare +2 (next two are mutually exclusive) | Points can range from 0 to 20 points |

TABLE A-continued

Point Calculations

| Features | Data Source | 100% Compliance | Partial Compliance |
|---|---|---|---|
| | | Walk to Elementary school +3 Close to Elementary School +2 (next two are mutually exclusive) Walk to Jr High +3 Close to Jr High +2 Planned Children's activities +3 | |
| Senior Living | use value of Sr Living | points assigned as follows: Seniors Only +5 points 24 hr Emergency Call Services +1 Maid Services +1 Scheduled transportation +2 Organized Activites +2 Monitored Home Alarm +1 Sr Center-Walk to +2 Sr. Center-Close to +1 Sr. Discount +2 | Can range from 0 to 15 (could actually exceed 15 if all items existed however 15 is maximum assignment) |
| Corporate Apartments | use value of CorpApt | Point assignments as follows: Complex specifically states "Corporate Apts available" Furnished Apartments Maid Service Conference Area available | range can be from 0 to 20 points. |
| 15 point Features | | | |
| Planned Activities | use value of PlannedActive | Point assignment is as follows: Social Events (Happy hour, movie nights, holiday celebrations) +3 Sports Events (softball, fitness training, walking clubs, team sports) +3 Business Network +2 Community Gardening +2 Volunteer Group +2 Educational +3 Scheduled Transportation +3 | range can be from 0 to 15. (actual point assignment could exceed 15 if all items existed, however 15 is the maximum) |
| Swimming Pool | use value of Pool | if greater than 0 then 15 points | |
| Tennis Court | use value of Tennis | if greater than 0 then 15 points | |
| Air Conditioning | use value of AirCondition | if Central Air then 15 points, | if Air Conditioning (not central) then 12 points |
| Gated Property | use value of GatedProp | if exists then 15 points | |
| Gated Parking | use value of GatedParking | if Gated Property or Gated Parking then 15 points. If Garage Attached in RentProf then 15 points | |
| Garage | use value of Garage | if included or available then 15 points | |
| Smaller Property | use value of SmallerProp | if 20 units or less then 15 points, | if 40 units or less then 5 points |
| Close to Ocean | use value of OceanClose | If walking distance then 15 points | if close to then 10 points |
| Walk to Public | use value of | if walking distance | 0 points |

TABLE A-continued

Point Calculations

| Features | Data Source | 100% Compliance | Partial Compliance |
|---|---|---|---|
| Transporation 5 Point Features | PublicTransport | then 15 points | |
| Month to Month lease period | use value of Monthly | if yes then 5 points | |
| 6 Month lease | use value of 6Months | if yes then 5 points | |
| 12 Months lease | use value of 12Months | if yes then 5 points | |
| Vacation rental | use value of Vacation | if yes then 5 points | If vacation is selected as the lease period and the value of VACATION is 0 then eliminate from the batch |
| Weekly | use value of Weekly | if yes then 5 points | if weekly is selected and the value of Weekly is 0 and the value of Monthly 0 then eliminate from the batch |
| Washer/Dryer (included) | use value of WasherDryer | if yes then 5 points | |
| Washer/Dryer Hookups | use value of Washer/Dryer Hookups | if yes then 5 points | |
| Refrigerator | use value of Refrigerator | up to 5 points based on Refrigerator-Available (2)or RefrigeratorIncluded(5) | |
| Dishwasher | use value of Dishwasher | if yes then 5 points | |
| Central Heat & Air | use value of CentralH&A | if yes then 5 points | |
| Newer Carpets | use value of NewerCarpet | if Carpet Age 2yrs or less then 5 points | |
| On-Site Laundry | use value of OnSiteLdy | if greater than 0 then 5 points, or if Washer/Dryer then 5 points | |
| Furnished Apartment | use value of Furnished | if yes then 5 points | |
| Fitness Center | use value of Fitness | if greater than 0 then 5 points | |
| Newer Property | use value of NewerProp | if 0–5 years then 5 points | |
| Military Discounts | use value of MilitaryDisc | if yes then 5 points | |
| Moderate Income Discounts | use value of ModerateDisc | if yes then 5 points | |
| Patio/Balcony | use value of PatioBalc | if yes then 5 points | |
| ExtraStorage | use value of ExtyraStorage | if storage on balcony/patio or parking then 5 points | |
| Clubhouse | use value of Clubhouse | if greater than 0 then 5 points | |
| Courtesy Patrol | use value of Patrol | if yes then 5 points | |
| Home Alarm System | use value of HomeAlarm | if yes then 5 points | |
| Monitored Alarm System | use value of MonitoredAlarm | if yes then 5 points | |
| Intercom System (visitor) | use value of Intercom | if yes then 5 points | |
| Sauna | use value of sauna | if yes then 5 points | |
| Spa | use value of Spa | if greater than 0 then 5 points | |
| Basketball Court | use value of Basketball | if greater than 0 then 5 points | |
| Racquetball Court | use value of Racquetball | if greater than 0 then 5 points | |

TABLE A-continued

Point Calculations

| Features | Data Source | 100% Compliance | Partial Compliance |
|---|---|---|---|
| Pool Tables | use value of PoolTables | if greater than 0 then 5 points | |
| Quiet Property | use value of QuietProp | if yes then 5 points | |
| Fireplace | use value of Fireplace | if yes then 5 points | |
| Scenic View | use value of ScenicView | if any defined view exists then 5 points | |

TABLE B

The Rental Kiosk tables of KRENTAL.DB (used for searching) and KRENTINF.DB (used for More Info display) are created from three Administration Rental Tables:
RENTALS.DB (basic information about the apartment community)
RENTPROF.DB (profile information about the apartment community)
RENTUNIT.DB (profile information about the specic rental unit types)

| KRENTAL Field | Admin Table | Admin Field | Conversion Instructions |
|---|---|---|---|
| RentalID | RENTUNIT | RentalID | use value (key field - 7 characters) |
| UnitID | RENTUNIT | UnitID | use value (key field - 1 character where S = Studio, 1 = 1 Bedroom, 2 = 2 Bedroom, 3 = 3 Bedroom, D = Dual Master Bedroom) |
| MType | RENTALS | AdType | use value (ST, SC, or SP where ST = Standard Ad SC = Showcase Ad SP = Spotlight AD) |
| BannerTitle | RENTALS | Banner | Decode value of Banner and use full name |
| RentalType | RENTALS | RentalType | use value (A, C, H where A = Apartment C = Condo or townhome H = Single Family Home) |
| ComplexName | RENTALS | ComplexName | use value |
| ManagedBy | RENTALS | ManagedBy | use id value to lookup in RENTMGR. If RENTMGR.MgrType = 'P' (professional) then insert Name1 value otherwise leave blank. |
| Address | RENTALS | Address | use value |
| City | RNNTALS | City | use value |
| ZipCode | RENTALS | ZipCode | use value |
| State | RENTALS | State | use value |
| Phone | RENTALS | OfficePhone | use value |
| Fax | RENTALS | OfficeFax | use value |
| HoursMonFri | RENTALS | HoursMonFri | use value |
| HoursSat | RENTALS | HoursSat | use value |
| HoursSun | RENTALS | HoursSun | use value |
| Street | RENTALS | Street | usc value |
| CrossStreet | RENTALS | CrossStreet | use value |
| MinRent | RENTUNIT | MinRent | use value |
| MaxRent | RENTUNIT | MaxRent | use value |
| NoBeds | RENTUNIT | (derived from UnitID) | if S then value = 1, if 1 then value = 1, if 2 then value = 2, if 3 then value = 3,if D then value = 2 |
| DualMasters | RENTUNIT | (derived from UnitID) | if D then value = Y |
| MinBaths | RENTUNIT | MinBaths | use value |
| MaxBaths | RENTUNIT | NoBaths | use value |
| Monthly | RENTPROF | Monthly | if Monthly = Y then value = 5 else value = 0 |
| 6Month | RENTPROF | 6Month | if 6Month = Y then value = 5 else value = 0 |
| 12Month | RENTPROF | 12Month | if 12Month = Y then value = 5 else value = 0 |
| Vacation | RENTPROF | Vacation | if Vacation = Y then value = 5 else value = 0 (property will be eliminated from the search batch if Vacation is selected and this value is zero) |
| Weekly | RENTPROF | Weekly | if Weekly = Y then value 5 else value = 0 (property will be eliminated from the search batch if Weekly is selected and this value is zero) |
| YngChildren | RENTPROF | ChildWadinPool | Points are accumulated depending on the sum |

TABLE B-continued

The Rental Kiosk tables of KRENTAL.DB (used for searching) and KRENTINF.DB
(used for More Info display) are created from three Administration Rental Tables:
RENTALS.DB (basic information about the apartment community)
RENTPROF.DB (profile information about the apartment community)
RENTUNIT.DB (profile information about the specic rental unit types)

| KRENTAL Field | Admin Table | Admin Field | Conversion Instructions |
|---|---|---|---|
| | | ChildWadingSuper<br>ChildPlayArea<br>ChildPlaySuper<br>ChildDayCareClos<br>ChildDayCareWalk<br>ChildElemSchClose<br>ChildElemSchWalk<br>ChildJrSchClose<br>ChildJrSchWalk<br>ChildPlanActive | of features include:<br>if ChildWadingPool then +3<br>if ChildWadingSuper then +1<br>if ChildPlayArea then +3<br>if ChildPlaySuper then +1<br>(the next two are mutually exclusive)<br>if ChildDayCareClose then +2<br>if ChildDayCardWalk then +3<br>(the next two are mutually exclusive)<br>if ChildElemSchClose then +2<br>if ChildElemSchWalk then +3<br>(the next two are mutually exclusive)<br>if ChildJrSchClose then +2<br>if ChildJrSchWalk then +3<br>ChildPlanActive +3<br>Highest Point value can be 20 points |
| Seniors | RENTPROF | SeniorsOnly<br>SeniorCtrClose<br>SeniorCtrWalk<br>Senior24hrCall<br>SeniorDiscount<br>MonitoredAlarm<br>MaidService<br>PlannedTransport<br>PlannedSocial | Points are accumulated depending on the sum of the features found:<br>if SeniorsOnly then +5<br>(the next two are mutually exclusive)<br>if SeniorCtrClose then +1<br>if SeniorCtrWalk then +2<br>if Senior24hrCall then +1<br>if SeniorDiscount then +2<br>if MonitoredAlarmn then +1<br>if MaidService then +1<br>if PlannedTransport then +2<br>if PlannedSocial then +2<br>Highest point value can be 15 points . . . if all values existed the accumulated points could exceed 15, cut off at 15 |
| PlannedActive | RENTPROF | PlannedBusNetwork<br>PlannedEducation<br>PlannedGardening<br>PlannedSocial<br>PlannedSports<br>PlannedTransport<br>PlannedVolunteer | Points are accumulated from the sum of features found:<br>if PlannedBusNetwork then +2<br>if PlannedGardening then +2<br>if PlannedSocial then +3<br>if PlannedSports then +3<br>if PlannedTransport then +3<br>if PlannedVolunteer then +2<br>Highest point value can be 15 points |
| Cat | RENTPROF | CatOK<br>CatApproval | if CatOK = "Y" then 20 points<br>if CatApproval = "Y" then 15 points |
| Dog | RENTPROF | DogOK<br>DogApproval | if DogOK= "Y" then 20 points<br>if DogApproval = "Y" then 15 points |
| NewerProp | RENTALS | YrBuilt | if YrBuilt = <5 years from current then value = 5 |
| SmallerProp | RENTALS | UnitsinProp | if UnitsinProp is 20 or less then 15 points<br>if UnitsinProp is 21–40 then 5 points else = 0 |
| Quietprop | RENTPROF | GroundsQuiet | if GroundsQuiet = "Y" then 5 points else 0 |
| GatedProp | RENTPROF | GatedProp | if GatedProp = "Y" then 15 points else 0 |
| GatedParking | RENTPROF | GatedParking<br>GatedProp<br>GarageAttached | if GatedParking = "Y" then 15 points or if<br>GatedProp = "Y" then 15 points or if<br>GarageAttached = "Y" then 15 points else 0 |
| HomeAlarm | RENTPROF | HomeAlarm | if HomeAlarm = Y then 5 points else 0 |
| MonitoredAlarm | RENTPROF | MonitoredAlarm | if MonitoredAlarm = Y then 5 else 0 |
| Intercom | RENTPROF | Intercom | If Intercom = Y then value = 5 else 0 |
| Patrol | RENTPROF | Patrol | if Patrol = Y then value = 5 else 0 |
| OnSiteLdy | RENTPROF | NoOnSiteLdy<br>WasherDryerIncluded | if NoOnSiteLdy >0 then 5 points or if<br>WasherDryerIncluded = "Y" then 5 points else 0 |
| Elevators | RENTPROF | Elevators<br>StuctureNoStories | if Elevators = "Y" then 20 points or if<br>StructureNoStories = 1 then 20 points else 0 |
| Pool | RENTPROF | NoPools | if NoPools >0 then 15 points |
| Tennis | RENTPROF | NoTennis | if NoTennis >0 then 15 else 0 |
| Fitness | RENTPROF | NoFitness | if NoFitness >0 then 5 points else 0 |
| Clubhouse | RENTPROF | NoClubhouses | if NoClubhouses >0 then 5 else 0 |
| Racquetball | RENTPROF | NoRacquetball | if NoRacquetball >0 then 5 else 0 |
| Basketball | RENTPROF | NoBasketball | if NoBasketball >0 then 5 else 0 |
| PoolTables | RENTPROF | PoolTables | if NoPoolTables >0 then 5 else 0 |
| MilitaryDisc | RENTPROF | MilitaryDisc | if MilitaryDisc = Y" then 5 else 0 |
| ModerateDisc | RENTPROF | ModerateDisc | if ModerateDisc = "Y" then 5 else 0 |
| SrDiscount | RENTPROF | SeniorDisc | if SeniorDisc = "Y" then 5 else 0 |

TABLE B-continued

The Rental Kiosk tables of KRENTAL.DB (used for searching) and KRENTINF.DB
(used for More Info display) are created from three Administration Rental Tables:
RENTALS.DB (basic information about the apartment community)
RENTPROF.DB (profile information about the apartment community)
RENTUNIT.DB (profile information about the specic rental unit types)

| KRENTAL Field | Admin Table | Admin Field | Conversion Instructions |
|---|---|---|---|
| StudentDisc | RENTPROF | StudentDisc | if StudentDisc = "Y" then 5 else 0 |
| CorpApt | RENTPROF | CorpApt<br>Furnished<br>MaidService<br>ConferenceArea | Value is the accumulative sum of the features<br>if CorpApt = "Y" then 15 points<br>if Furnished = "Y" then +2 points<br>if MaidService = "Y" then +2 points<br>if ConferenceArea = "Y" then +1 point<br>Highest value is 20 points |
| Furnished | RENTPROF | Furnished | if Furnished = Y then 5 else 0 |
| Handicap | RENTPROF | Handicap<br>MaidService<br>EmergencyCall<br>MonitoredAlarm<br>Elevator | value is the accumulative sum of features:<br>if Handicap = "Y" then 15 points<br>if MaidService = "Y" then +2<br>if EmergencyCall = "Y" then +2<br>if MonitoredAlarm = "Y" then +2<br>if Elevator = "Y" then +2<br>Highest value = 20 points (sum could exceed if all features but limit to 20 points) |
| NewerCarpet | RENTPROF | CarpetAge | if CarpetAge is 2 Years or less from current year then 5 points else 0 |
| Dishwasher | RENTPROF | Dishwasher | if Dishwasher = Y then 5 else 0 |
| Refrigerator | RENTPROF | RefrigeratorAvailable<br>RefrigeratorIncluded | If RefrigeratorAvailable then 5 or if RefrigeratorIncluded then 2 else 0 |
| Fireplace | RENTPROF | BedroomFireplace<br>LivingRmFireplace<br>FamilyRmFireplace | if BedroomFireplace or if LivingRmFireplace or if FamilyRmFireplace = "Y" then 5 points |
| WashDryIncluded | RENTPROF | WashDryIncluded | if WashDryIncluded = "Y" then 5 points else 0 |
| WashDryHookups | RENTPROF | WashDryHookups | if WashDryHookups = "Y" then 5 points else 0 |
| CentralH&A | RENTPROF | CentralH&A | if CentralH&A = Y then 5 else 0 |
| AirCondition | RENTPROF | AirCondition<br>CentralH&A | if AirCondition = "Y" then 5 or if Central H&A = "Y" then 5 else 0 |
| PatioBalc | RENTPROF | PatioBalc<br>PatioYard | if PatioBalc = "Y" or if PatioYard Y then 5 points else 0 |
| ExtraStorage | RENTPROF | PatioBalcStorage<br>ParkingStorage | if PatioBalcStorage = Y or if ParkingStorage = "Y" then 5 points else 0 |
| AssignedParking | RENTPROF | AssignParking<br>GarageAvailable<br>GarageIncluded | if Assigned Parking = Y or if GarageAvailable or GarageIncluded = Y then 20 points else 0 |
| Garage | RENTPROF | GarageAvailable<br>GarageIncluded | if GarageAvailable or if GarageIncluded = "Y" then 15 points else 0 |
| CoveredParking | RENTPROF | CoveredParking<br>GarageAvailable<br>GarageIncluded<br>UndergroundParking | if CoveredParking or GarageAvailable or GarageIncluded or UndergroundParking = Y then 20 points else 0 |
| OceanClose | RENTPROF | OceanClose<br>OceanWalk<br>ViewOcean | if OceanWalk = "Y" then 15 points, if OceanClose or ViewOcean then 10 points else 0 |
| ScenicView | RENTPROF | ViewOcean<br>ViewBay<br>ViewLakefront<br>ViewMountain<br>View Canyon<br>ViewCityLights<br>ViewHillside | if any *.views = Y then value = 5 else 0 |
| PublicTransport | RENTPROF | WalkPubTrans | if walkPubTrans = Y then 15points else 0 |
| AdCode1 | RENTALS | AdCode1 | use value |
| AdCode2 | RENTALS | AdCode2 | use value |
| AdCode3 | RENTALS | AdCode3 | use value |
| AdCode4 | RENTALS | AdCode4 | use value |
| AdCode5 | RENTALS | AdCode5 | use value |
| AdCode6 | RENTALS | AdCode6 | use value |
| AdCode7 | RENTALS | AdCode7 | use value |
| AdCode8 | RENTALS | AdCode8 | use value |
| AdCode9 | RNNTALS | AdCode9 | use value |
| StudioCost | RENTPROF | StudioCost | use value |
| 1BedCost | RENTPROF | 1BedCost | use value |
| 2BedCost | RENTPROF | 2BedCost | use value |
| 3BedCost | RENTPROF | 3BedCost | use value |
| SecDeposit | RENTUNIT | SecDeposit | use value |
| KeyDep | RENTPROF | KeyDeposit | usevalue |
| CleanDeposit | RENTUNIT | CleanDeposit | use value |
| CleanFee | RENTUNIT | CleanFee | use value |

TABLE B-continued

The Rental Kiosk tables of KRENTAL.DB (used for searching) and KRENTINF.DB (used for More Info display) are created from three Administration Rental Tables:
RENTALS.DB (basic information about the apartment community)
RENTPROF.DB (profile information about the apartment community)
RENTUNIT.DB (profile information about the specic rental unit types)

| KRENTAL Field | Admin Table | Admin Field | Conversion Instructions |
|---|---|---|---|
| CreditFee | RENTPROF | CreditFee | use value |
| DogDeposit | RENTPROF | DogDeposit | use value |
| CatDeposit | RENTPROF | CatDeposit | use value |

What is claimed is:

1. A method for searching for items in a search pool based on selected search features, comprising the steps of:

selecting a plurality of primary and non-primary search features to be used for basing a search for items in the search pool;

comparing each item in the search pool with said plurality of primary search features;

eliminating items in the search pool which are not an exact match or a near match with said plurality of primary search features;

comparing each item remaining in the search pool with said plurality of non-primary search features;

assigning points to an item in the search pool for a feature which is an exact match or a near match to a feature in said plurality of primary and non-primary search features, all said points to be assigned to said features being predetermined and not requiring input by a user requesting said searching for said items; and generating a predetermined number of items in the search pool with the highest total points.

2. The method of claim 1 wherein said step of assigning further comprises the steps of:

assigning points for said primary search features; and assigning points for said non-primary search features.

3. The method of claim 2 wherein said step of assigning points for said primary search features further comprises the steps of:

assigning full points to an item in said search pool for each said primary search features for which an exact matching feature exists in said item;

assigning partial points to said item in said search pool for each said primary search features for which a near matching feature exists in said item; and eliminating said item in said search pool from a search pool for each said primary search features which does not exist in said item.

4. The method of claim 2 wherein said step of assigning points for said non-primary search features further comprises the steps of:

assigning full points to an item in said search pool for each said non-primary search features for which an exact matching feature exists in said item; and assigning partial points to said item in said search pool for each said non-primary search features for which a near matching feature exists in said item.

5. An apparatus for searching for items in a search pool based on selected plurality of primary and non-primary search features, said apparatus comprising:

a first storage element for storing text data of the search pool;

a second storage element for storing audio and visual data of the search pool;

a comparator element for comparing each item in the search pool for a feature which is an exact match or a near match to said plurality of primary or non-primary search features, said comparator element comparing each item with said plurality of primary search features before comparing selected said each item which is an exact match or a near match to said primary search feature with said non-primary search features;

a point assignment element for assigning points to an item in the search pool for a feature which is an exact match or a near match to a primary or a non-primary feature in said search features, said point assignment element assigning points to an item based on a plurality of tables including a predetermined schedule of points to be assigned to said features of an item;

a third storage element for storing said text, audio, visual data and said point assignment element of the search pool;

a CPU for processing the data in said first storage element, said second storage element and said third storage element; and a display element for displaying said search features and search results.

6. The apparatus of claim 5 wherein said point assignment element further comprises:

a primary point assignment element for assigning points for primary search features; and a non-primary point assignment element for assigning points for non-primary search features.

7. The apparatus of claim 6 wherein said primary point assignment element further comprises:

a primary exact match element for assigning full points to an item in said search pool for each said primary search features for which an exact matching feature exists in said item;

a primary near match element for assigning partial points to said item in said search pool for each said primary search features for which a near matching feature exists in said item; and a primary no match element for eliminating said item in said search pool from a search pool for each said primary search features which does not exist in said item.

8. The apparatus of claim 6 wherein said non-primary point assignment element further comprises:

a non-primary exact match element for assigning full points to an item in said search pool for each said non-primary search features for which an exact matching feature exists in said item; and a non-primary near match element for assigning partial points to said item in said search pool for each said non-primary search features for which a near matching feature exists in said item.

9. A system for searching for items in a search pool based on selected plurality of primary and non-primary search features, said system comprising:

a first storage element for storing text data of the search pool;

a second storage element for storing audio and visual data of the search pool;

a comparator element for comparing each item in the search pool for a feature which is an exact match or a near match to said plurality of primary or non-primary search features, said comparator element comparing each item with said plurality of primary search features before comparing selected said each item which is an exact match or a near match to said primary search feature with said non-primary search features;

a point assignment element for assigning points to an item in the search pool for a feature which is an exact match or a near match to a primary or a non-primary feature in said search features, said point assignment element assigning points to an item based on a plurality of tables including a predetermined schedule of points to be assigned to said features of an item;

a third storage element for storing said text, audio, visual data and said point assignment element of the search pool;

a CPU for processing the data in said first storage element, said second storage element and said third storage element; and a display element for displaying said search features and search results comprising items with highest total points.

10. The system of claim 9 wherein said point assignment element further comprises:

a primary point assignment element for assigning points for primary search features; and a non-primary point assignment element for assigning points for non-primary search features.

11. The system of claim 10 wherein said primary point assignment element further comprises:

a primary exact match element for assigning full points to an item in said search pool for each said primary search features for which an exact matching feature exists in said item;

a primary near match element for assigning partial points to said item in said search pool for each said primary search features for which a near matching feature exists in said item; and a primary no match element for eliminating said item in said search pool from a search pool for each said primary search features which does not exist in said item.

12. The system of claim 10 wherein said non-primary point assignment element further comprises:

a non-primary exact match element for assigning full points to an item in said search pool for each said non-primary search features for which an exact matching feature exists in said item; and a non-primary near match element for assigning partial points to said item in said search pool for each said non-primary search features for which a near matching feature exists in said item.

13. An apparatus for searching for items in a search pool based on selected plurality of primary and non-primary search features, said apparatus comprising:

means for storing text data of the search pool;

means for storing audio and visual data of the search pool;

means for comparing each item in the search pool for a feature which is an exact match or a near match to said plurality of primary or non-primary search features, said means for comparing compares each item with said plurality of primary search features before comparing selected said each item which is an exact match or a near match to said primary search feature with said non-primary search features;

means for assigning points to an item in the search pool for a feature which is an exact match or a near match to a primary or a non-primary feature in said search features, said means for assigning points to an item performing said assigning based on a plurality of tables including a predetermined schedule of points to be assigned to said features of an item;

means for storing said text, audio, visual data and said means for assigning points;

means for processing the data in said means for storing text, said means for storing audio and said means for assigning; and means for displaying said search features and search results.

14. The apparatus of claim 13 wherein said means for assigning points further comprises:

means for assigning points for primary search features; and means for assigning points for non-primary search features.

15. The apparatus of claim 13 wherein said means for assigning points for primary search features further comprises:

means for assigning full points to an item in said search pool for each said primary search features for which an exact matching feature exists in said item;

means for assigning partial points to said item in said search pool for each said primary search features for which a near matching feature exists in said item; and means for eliminating said item in said search pool from a search pool for each said primary search features which does not exist in said item.

16. The apparatus of claim 13 wherein said means for assigning points for non-primary search features further comprises:

means for assigning full points to an item in said search pool for each said non-primary search features for which an exact matching feature exists in said item; and means for assigning partial points to said item in said search pool for each said non-primary search features for which a near matching feature exists in said item.

17. An apparatus for performing a search for homes in a search pool, and housed in an enclosure comprising:

a touch monitor for displaying selection screens, and for accepting inputs, said selection screens displaying a predetermined number of selection features;

a database containing a predetermined number of items to be searched;

a search software for producing a predetermined number of search results based on said predetermined number of primary and non-primary selection features and by searching through said database for said items with features matching said primary and non-primary selection features and assigning points to said features corresponding to matching primary and non-primary selection features, said primary selection features being evaluated before said non-primary selection features, all said points to be assigned to said features being predetermined and not requiring input of said points by a user requesting said search;

a computer for running said search software;

a printer for producing a printout with information on a predetermined number of search results;

a printer output portion for dispensing said printout; and a first storage element for storing said database.

18. The apparatus of claim 17 further comprising a second storage element for storing said database.

19. The apparatus of claim 17 wherein said first storage element comprises a hard disk.

20. The apparatus of claim 18 wherein said second storage element comprises CD ROMs.

21. The apparatus of claim 18 wherein said second storage element comprises floppy disks.

22. The apparatus of claim 18 wherein said search software further comprises a loan search element for searching for home loans.

23. The apparatus of claim 18 wherein said search software further comprises a rental search element for searching for rental properties.

24. A system for performing a search for homes in a search pool, and housed in an enclosure comprising:

a touch monitor for displaying selection screens, and for accepting inputs, said selection screens displaying a predetermined number of selection features;

a database containing a predetermined number of items to be searched;

a search software for producing a predetermined number of search results based on said predetermined number of primary and non-primary selection features and by searching through said database for said items with features matching said primary and non-primary selection features and assigning points to said features corresponding to matching primary and non-primary selection features, said primary selection features being evaluated before said non-primary selection features, all said points to be assigned for said features being predetermined and not requiring input of said points by a user requesting said search;

a computer for running said search software;

a printer for producing a printout with information on a predetermined number of search results;

a printer output portion for dispensing said printout; and a first storage element for storing said database.

25. The system of claim 24 further comprising a second storage element for storing said database.

26. The system of claim 24 wherein said first storage element comprises a hard disk.

27. The system of claim 25 wherein said second storage element comprises CD ROMs.

28. The system of claim 25 wherein said second storage element comprises floppy disks.

29. The system of claim 24 wherein said search software further comprises a loan search element for searching for home loans.

30. The system of claim 24 wherein said search software further comprises a rental search element for searching for rental properties.

* * * * *